United States Patent

[11] 3,549,180

[72] Inventor Wallace MacWilliam
Ridgewood, N.J.
[21] Appl. No. 729,783
[22] Filed May 16, 1968
[45] Patented Dec. 22, 1970
[73] Assignee Scovill Manufacturing Company
Waterbury, Conn.
a corporation of Connecticut

[54] HOSE AND HOSE COUPLING ASSEMBLY
3 Claims, 3 Drawing Figs.
[52] U.S. Cl. ................................................ 285/256
[51] Int. Cl. ................................................ F16l 33/20
[50] Field of Search ........................................... 285/256,
259, 95, 239—255, 257, 258, 174, Mastic;
138/109

[56] References Cited
UNITED STATES PATENTS
1,942,829  1/1934  Pentz ............................. 285/251

| | | | |
|---|---|---|---|
| 2,453,997 | 11/1948 | MacWilliam .................. | 285/256 |
| 2,485,976 | 11/1949 | Main ............................ | 285/256X |
| 2,920,910 | 1/1960 | Schnabel ..................... | 285/256X |
| FOREIGN PATENTS | | | |
| 1,021,245 | 3/1966 | Great Britain ................ | 285/242 |

Primary Examiner—Dave W. Arola
Attorney—Dallett Hoopes

ABSTRACT: The hose includes an internal rubber tube, an outer neoprene layer, and an intermediate braided textile layer. The end is disposed in the hose-receiving annulus between the tubular portion and the ferrule of the metal coupling. The ferrule is connected to the tubular portion by a connecting wall. A thermosetting sealing compound covers the end of the hose and is not bonded to at least a portion of the connecting wall. The ferrule is indented in a peripheral zone spaced from the hose end, compressing the hose between the ferrule and the tubular portion of the coupling.

PATENTED DEC 22 1970

3,549,180

INVENTOR
Wallace MacWilliam
BY Dallett Hoopes
ATTORNEY

HOSE AND HOSE COUPLING ASSEMBLY

This invention relates to a hose and hose coupling assembly and the method of making it. More specifically, this invention relates to a substantially leakproof hose and hose coupling assembly useful in conducting fluorocarbons under conditions of high temperature and pressure.

In the past, it has been conventional to employ flexible hoses in automobile air-conditioning systems, between the refrigeration components. Usually, these hoses have comprised hose and hose coupling assemblies wherein the hose has included an internal tube of synthetic rubber, for instance, an external layer of neoprene or the like and an intermediate layer of textile or wire braiding.

The end of such a hose has been fitted over the tubular portion of a metal coupling and inserted into the coupling ferrule. Thereafter, the ferrule has been indented, peripherally compressing the hose in an area spaced from the hose end. Such an assembly has then been installed in the system, for instance, between the compressor and condenser. In such usage, the hose is subjected to pressures up to 300 pounds per square inch of a fluorocarbon refrigerant and temperatures up to 300°. In such usage, considerable leakage of fluorocarbon has been believed almost inevitable.

In tests required by American automobile manufacturers for hoses to be used in automobile air-conditioning systems, the hose has been partly filled with fluorocarbon refrigerant partly in liquid state subjected to a temperature of 250° and has been required to withstand these conditions for a period of 3 days. Almost invariably leakage has shown adjacent to the hose coupling, and it has been found that the leaking gas has passed between the internal tube of the hose and the tubular portion of the metal coupling to the end of the hose and has then passed between the cover and the ferrule and also along the braiding and out through the neoprene cover which has been perforated to avoid "blistering" or separating away from the braid.

From the examination of samples which underwent tests at temperatures in excess of 200° F., the "compression set" of both the tube and the cover apparent. In other words, when the hose is removed from the coupling, it retains the shape of the recess between the ferrule and the tubular portion. A correlation between this phenomenon and the leakage at pressures considerably lower than those which would have caused leakage prior to set is explainable: the set itself reduces the compression of the hose material between the tubular portion and the ferrule.

I have discovered, contrary to what might be expected under the circumstances, that substantially all leakage may be eliminated by a simple and inexpensive treatment of the hose during assembly.

The present invention provides means for automatically compensating for the compression set phenomenon to preclude coupling leakage and acts to an extent proportionate to the pressure imposed on the hose line.

Other objects of the invention will be understood from reading the following specification with reference to the drawing wherein.

Figure 1:
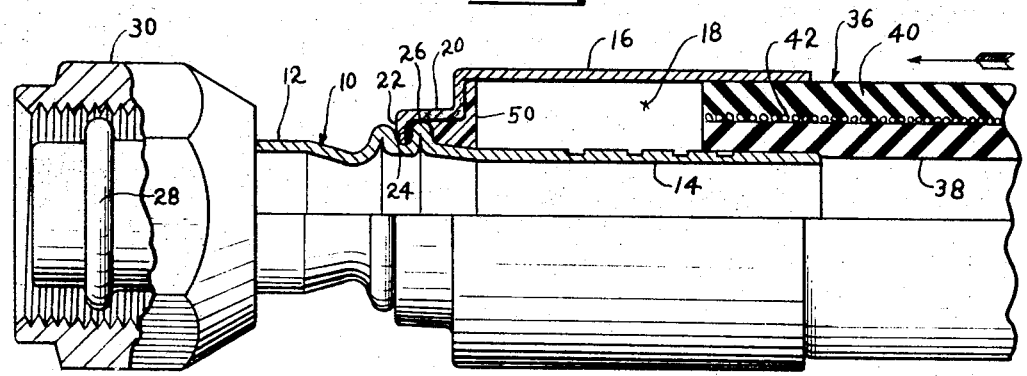
FIG. 1 is a side elevation, partly in section, of an assembly undergoing a method of manufacture embodying my invention.

Referring more specifically to the drawings, FIG. 1 shows elements in partial assembly in accordance with the invention. The coupling is generally designated 10 and comprises a body 12 having tubular portion 14 and a ferrule 16 concentric to the tubular portion so as to define a tube-receiving annulus 18. The tubular portion may be annularly indented as shown. The ferrule 16 is connected to the tubular portion by a connecting wall 20 which may be stepped as shown to end in an inturned flange 22 which is mechanically secured to the tube portion 14 as by swaging or crimping of the tube portion about the opposite sides of the inturned flange to seal off the annulus 18. A gasket 24 or other sealing means is sealingly confined between a deformed portion 26 of the tube portion 14 and the ferrule 16 so as to enhance the seal.

The rigid coupling 10 has a stop bead 28 and an internally threaded nut 30 as is well known in the art.

The hose s generally designated 36 and is formed in a conventional manner. It comprises an internal tube 38 which may be a buna-type rubber and a cover 40 which may be of neoprene disposed about tube 38. A layer of braid 42 is disposed intermediate the cover and tube, and serves to reinforce the structure and to hold the cover to the tube. The hose 36 is shoved into the annulus 18. A layer of a thermoset sealing compound 50 covers the end faces of the tube, cover and braid. This compound is allowed to set at room temperature.

Figure 1A:
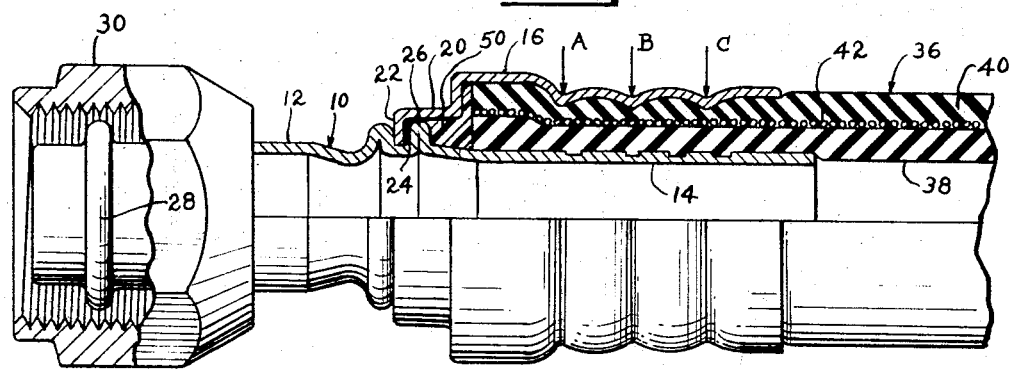
FIG. 1a is a side elevation, partly in section, of the completed assembly embodying my invention.

Referring to FIG. 1a, after the final placement of the hose in the annulus, the ferrule 16 is indented in peripheral areas spaced from the hose end so as to compress the hose in these zones. The peripheral indentations are designated by arrows A, B, and C in FIG. 1a.

The composition of the sealing compound has been found to be important. A suitable sealing compound has been found to be neoprene compound 01952, manufactured by U.S. Rubber Company of Passaic, N.J. This compound is available in two parts, one of which is the polymerizable neoprene cement, and the other is an accelerator. In use, these two parts are mixed and the mixture is inserted in annulus 18 or applied to the hose end. The assembly is left undisturbed and curing is accomplished in about 2 hours at room temperature.

Other thermosetting compounds including various epoxy resins have been found suitable.

Assemblies made in accordance with the above-described invention have been found to be virtually leakproof under the above-described fluorocarbon test. The effectiveness is explained as follows. The sealing compound selected, being not bonded to the parts of the connecting wall, acts as a piston, its leftward face in FIG. 1 serving as a working surface. Thus, the sealing compound and hose material is acted on by the gas leakage which passes between the tubular portion 14 and the hose and reaches the vicinity of connecting wall 20. This urges hose material rightward as shown in FIG. 1a, further compressing the hose in the restricted portion under the peripheral indentations A, B, and C cramming more hose material in these areas and avoiding leakage along the braid and between the hose and ferrule.

Lending support to the explanation above are the results of tests on assemblies made in accordance with the invention. Assemblies tested had been subjected to temperatures of over 200° F. causing the compression set referred to above. In the tests, a pressure guage designated A was connected to the space between the hose and the ferrule. A second gauge B was installed in the Freon line. Readings were as follows:

| Gauge A, p.s.i. | Gauge B, p.s.i. |
| --- | --- |
| 190 | 300 |
| 240 | 400 |
| 300 | 500 |

The ratio of A/B was approximately .6 for each set of readings. For the second assembly, still made in accordance with the invention, readings were:

| Gauge A, p.s.i | Gauge B, p.s.i. |
| --- | --- |
| 160 | 300 |
| 200 | 400 |
| 230 | 500 |

The ratio here was approximately .5. The assemblies thus give the characteristics of a pressure-activated seal whereby for each increment in line pressure there is a proportionate increment in effectiveness of the seal.

To assure that the sealing compound does not bond to the connecting wall 20, the connecting wall may be coated with oil or any of the well-known mold release agents such as a silicone fluid or grease, or one of the fluorocarbon polymers.

The hose assemblies made in accordance with the invention have demonstrated remarkable versatility operating under temperature and pressure conditions both above and below those demanded under the normal operating conditions of an automobile air-conditioning system. While the assembly under the invention may be found highly satisfactory in conducting many fluorocarbons Freon 12, a brand of dichlorodifluourmethane, has been the refrigerant used in many of the actual installations.

Figure 2:
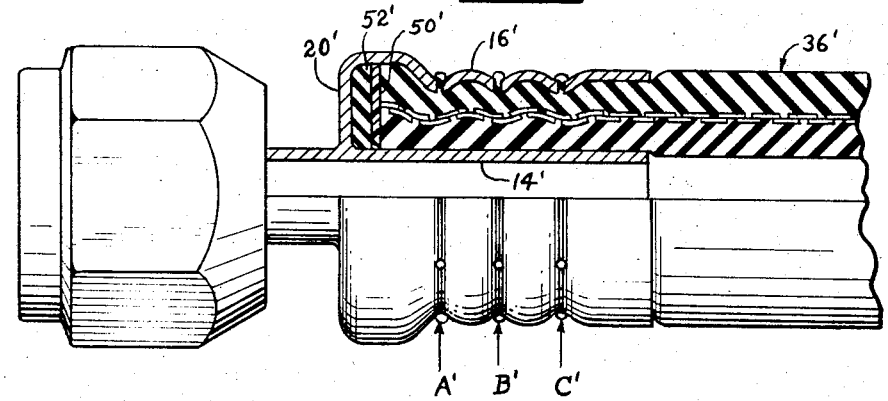
FIG. 2 is a partial side elevation, partly in section, of a modified form of product having been made in accordance with my invention.

A variation of the invention of an assembly made in accordance with the invention is shown in FIG. 2. In the FIG. 2 version, the tubular portion 14' is integrally formed with the ferrule 16' and the connecting wall 20'. The end of the hose 36' is covered with the sealing compound 50' and an additional sealing gasket 52' of rubber or elastometer is engaged by the sealing compound. The gasket obviously keeps the sealing compound from being bonded to the connecting wall. As shown, the ferrule is indented in the peripheral zones indicated by the arrows.

The development of hose coupling assemblies by the simple expedients described herein is totally new and wholly unexpected. It will be apparent that this simple inexpensive improvement and unconventional assembly process fills a long-felt need, especially in the field of the refrigeration systems in automotive vehicles.

While the invention has been shown and described in a limited number of forms, it is obvious that it is not so limiting but us susceptible of a large number of modifications and variations, and it is intended that the patent coverage be reflected in the appended claim language.

I claim:

1. A hose and hose coupling assembly especially adapted for use in conducting fluorocarbons under conditions of high pressure and temperature comprising: a metal coupling including a tubular portion surrounded by a ferrule connected to the tubular portion by a connecting wall to define a hose-receiving annulus; a hose including an internal tube of a buna-type rubber; an external cover of neoprene, and an intermediate reinforcing layer of braid, the hose having its end disposed in the annulus, and a cured thermosetting sealing compound means extending from said tubular portion to said ferrule and being in engagement with said connecting wall, said thermosetting compound means bonded to the end faces of the tube, cover and braid and not to at least some portions of the connecting wall, the ferrule being peripherally indented against the hose thereby compressing the hose in at least one zone spaced from the hose end.

2. A device as described in claim 1 wherein the thermosetting sealing compound is a polymerizable neoprene compound.

3. A device as described in claim 1 wherein the thermosetting sealing compound means includes an annular layer of gasket material adjacent the connecting wall assuring that the means is not bonded to the connecting wall.